(12) United States Patent
Ilgenfritz

(10) Patent No.: US 8,612,266 B1
(45) Date of Patent: Dec. 17, 2013

(54) DISTRIBUTING FINANCIAL RISK FOR INSURANCE COVERAGE

(75) Inventor: Mark Ilgenfritz, Marietta, GA (US)

(73) Assignee: Apollo Healthcare, LLC, Atlanta, GA (US)

( * ) Notice: Subject to any disclaimer, the term of this patent is extended or adjusted under 35 U.S.C. 154(b) by 0 days.

(21) Appl. No.: 13/243,074

(22) Filed: Sep. 23, 2011

Related U.S. Application Data

(60) Provisional application No. 61/386,425, filed on Sep. 24, 2010.

(51) Int. Cl.
*G06Q 40/00* (2012.01)

(52) U.S. Cl.
USPC .......................................................... 705/4

(58) Field of Classification Search
USPC .......................................................... 705/4
See application file for complete search history.

(56) References Cited

U.S. PATENT DOCUMENTS

| | | | |
|---|---|---|---|
| 2007/0073561 A1* | 3/2007 | Malackowski et al. | 705/4 |
| 2008/0162194 A1* | 7/2008 | Strnad et al. | 705/4 |
| 2009/0150192 A1* | 6/2009 | Gore et al. | 705/4 |
| 2009/0164256 A1* | 6/2009 | Fisher et al. | 705/4 |

OTHER PUBLICATIONS

Avizent www.avizentrisk.com "Avizent Introduces New, Innovative Captive Program Covering Excess Risk for Employee Health Benefits" Feb. 23, 2010.*

AON Consulting, "Employee Benefit Captives, Their Role in Managing Enterprise Risk", O'Donnell et al., Copyright 2008.*

* cited by examiner

*Primary Examiner* — Thomas M Hammond, III

(74) *Attorney, Agent, or Firm* — Taylor English Duma LLP

(57) ABSTRACT

Systems and methods for distributing and mitigating financial risk among a number of entities are provided. Among several implementations of methods implemented by a computer, one embodiment of a computer-implemented method includes establishing an insurance plan for one or more client groups, each client group comprising one or more members. The method also includes creating at least three layers of financial responsibility within the insurance plan. Each layer of financial responsibility defines an entity responsible for payment of insurance claims within the respective layer. In some implementations, the insurance plan may include an agreement that at least a minimum percentage of the members of each client group participate in one or more wellness programs.

14 Claims, 9 Drawing Sheets

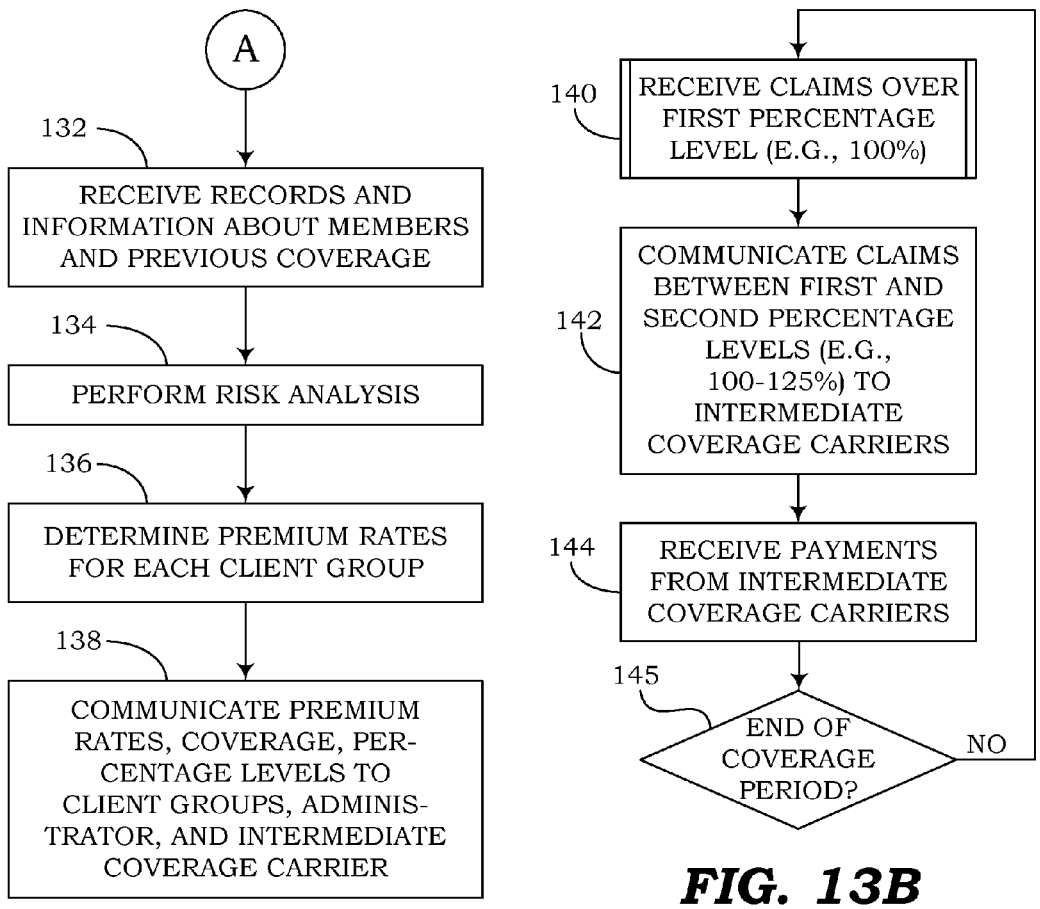
FIG. 13A
FIG. 13B
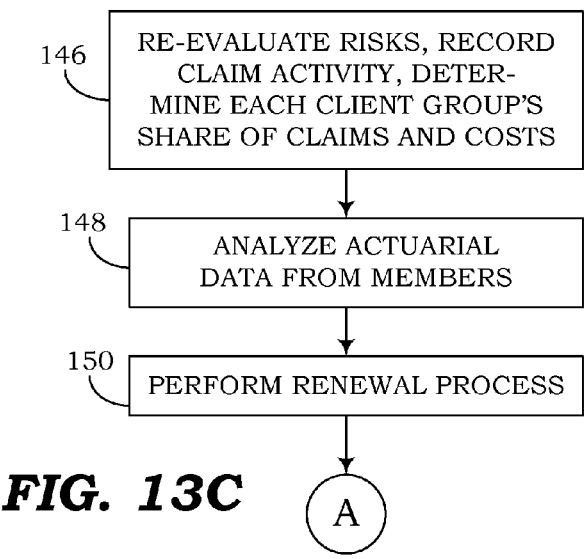
FIG. 13C

DISTRIBUTING FINANCIAL RISK FOR INSURANCE COVERAGE

CROSS-REFERENCE TO RELATED APPLICATIONS

This application claims the benefit of U.S. Provisional Application No. 61/386,425, filed Sep. 24, 2010, the entire disclosure of which is hereby incorporated by reference herein.

TECHNICAL FIELD

The present disclosure generally relates to insurance programs, and more particularly relates to mitigating and distributing the financial risk among multiple entities for covering health insurance claims.

BACKGROUND

It is currently believed that the United States spends more on healthcare than any other nation in the world both on a per capita basis and as a portion of gross domestic product. Over time, healthcare costs in the United States have increased 10-12% per year. It is estimated that the annual cost of healthcare in the United States will exceed $4 trillion in 2016. Although recent Healthcare Reform legislation makes significant progress in terms of access and fairness in the insurance marketplace, there is continuing concern that the fundamental causes of rising costs have not been addressed.

A large percentage of the population of the United States pays for healthcare costs through health insurance obtained through their employer. For many small business owners, though, the cost of health insurance is a major concern. Many small to medium sized businesses find that they have had to limit employee healthcare options because of high costs and that it is difficult to maintain previous levels of coverage for employees.

At the same time, many physicians and health organizations are concerned about the high percentage of total healthcare costs in the United States that are directly associated with behavior-based illnesses and conditions. The need for incentives, guidance, and support for lifestyle changes that are required in order to alleviate both the suffering and expense of a variety of self-imposed medical problems is being effectively addressed in many instances by employer-based "Wellness Programs." The more substantive Wellness Programs are generating measurable positive impacts both in terms of clinical measurements and in terms of reduced per capita health insurance claims within the groups that sponsor them. One distinction evident among the various Wellness Programs and their methods is that scheduled individual coaching on a live, person-to-person basis generates significantly better results than other less personal or more passive formats. Such robust programs, while they may generate substantial returns on investment, have a significant cost component. Furthermore, while the claim reducing impact of Wellness Programs is definite and measurable, the appearance of results in terms of claim cost reduction require time (often several years) before they begin to be realized.

This expense factor, in the context of standard health insurance models, creates a very serious obstacle in terms of wellness and health management initiatives for mid-market sized companies (e.g., 50-750 employees). As they struggle year after year to deal with rising health plan costs, they generally cannot or will not take on significant additional health plan expense (e.g., Wellness Program overhead) unless it will predictably lead to some positive financial result without assuming undue financial risk.

In the current art, there are essentially two types of healthcare plans (i.e., fully-insured plans and self-funded plans) available to these companies. Fully-insured healthcare plans include an arrangement in which an employer pays a premium calculated to represent the entire cost of providing coverage for its members and an insurance company bears the financial risk of providing that coverage for the members of that group. Self-funded healthcare plans include an arrangement in which a group (e.g., an employer) directly pays the cost of coverage for its members, subject to financial limits established with "stop loss" coverage. Because of the financial risk of self-funded plans, a group may wish to reduce its risk by purchasing "stop loss" insurance from a stop loss insurance carrier. Stop loss coverage creates a maximum limit on the financial liability of the group and therefore protects the group from excessive claim costs both in the circumstance of high claims for a single covered individual (i.e., "specific stop loss") as well as that of high claim totals for the entire group (i.e., "aggregate stop loss" or "ASL"). The group (e.g., employer) remains liable for paying medical claims up to a certain level at which the stop loss carrier takes over the payments.

However, neither fully-insured plans nor self-funded plans can deliver both the protection and financial incentive necessary to adequately reward plans that incorporate Wellness Programs. Fully-insured plans cannot do so due to their inability to timely and appropriately reward lower claims. Conventional self-funded plans cannot do so due to the unacceptable level of financial risk that they generate.

FIG. 1 is a block diagram showing a conventional stop loss insurance arrangement 10. As shown, the conventional stop loss insurance arrangement 10 comprises a client group 12, an optional third party administrator 14, and a stop loss carrier 16. The arrangement 10 may further comprise simple computer-based communication and information interfaces between the entities. The client group 12 (e.g., company, organization, etc.) may obtain stop loss insurance directly from the stop loss carrier 16 or may utilize the services of the third party administrator 14 to obtain stop loss insurance. The third party administrator 14 may also manage the exchange of funds between the client group 12 and the stop loss carrier 16. The third party administrator 14 may receive premiums from the client group 12 to pay the stop loss carrier 16 for stop loss insurance coverage. The stop loss insurance arrangement 10 requires the client group 12 to pay for medical expenses up to a predetermined level (e.g., 125% of an actuarially determined expected amount). Any expenses over the predetermined level are paid by the stop loss carrier 16.

The conventional stop loss insurance arrangement 10 may include self-funding risk management having self-funded liability for the client group 12 and additional liability transferred to the stop loss carrier 16. In this arrangement, populated by only two risk-bearing entities (i.e., the client group 12 and the stop loss carrier 16), the electronic records, formulas and financial transfers are organized around an actuarial assessment of expected claims. Typically, this assessment of expected claims is then multiplied by a factor of 125%. The expected risk represents a combination of both less-frequent large expenses and more-frequent small expenses. Medical claims below 125% of the expected level of expense is the liability of the client group 12 and the risk above this threshold is the liability of the stop loss carrier 16.

FIG. 2 is a graph showing the financial risk distribution for the conventional stop loss insurance arrangement 10 of FIG.

1. Medical claims are paid by the two separate entities according to the different layers of financial responsibility or liability. As shown, claim totals that are equal to or below 125% of the expected level of expenses are the liability of the client group 12. Therefore, the client group 12 under this arrangement pays up to a set threshold level (e.g., 125% of the expected level). Medical claims that exceed the threshold level are the liability of the stop loss carrier 16.

Under the conventional stop loss insurance arrangement 10, the client group 12 (e.g., employer) agrees to pay for the claims incurred by the plan's members directly through the third party administrator 14. The casualty insurance, or stop loss coverage, provides an overall cap on a monthly basis for the aggregate total of the claims that the client group 12 will be responsible for funding. The maximum funding liability is called the "Attachment Point" and is calculated as the aggregate cumulative total of "Attachment Factors" (monthly claim maximums set on a per employee basis) issued by the stop loss carrier 16 each year as representative of the level of risk it will accept. Specific stop loss is the other standard insurance component of self-funded plans and is a form of casualty insurance which limits the expenses for which the employer is liable on an individual basis. This provides a high individual "deductible" (often $25,000 to $150,000) on each member of the plan above which the employer is not responsible to fund claims.

In general, an issue with stop loss coverage, which essentially results in deterrence to adoption of a self-funded plan, is that the level of protection that stop-loss carriers 16 are willing to provide for ASL is generally at a substantial factor above actuarially expected claims, most often at 125% of the expected total. This means that, while a successful claims year could yield total plan costs significantly lower than a conventional fully insured plan (which includes a cost factor, generally in the range of 100% to 105% of expected claims, in the premium), an unsuccessful year could result in much higher costs. For example, faced with a 12% fully insured renewal premium increase, a "mid-market" company might avoid the increase or even reduce their current costs over the next 12 months with a successful claim year under a self-funded plan. On the other hand, if the company had a year with a high claims volume, it could spend 15% to 20% more than the renewal increase. This "toss-up" type parity between the potential for savings and the potential for cost increases, combined with the inherent statistical volatility of the group size of mid-market companies, prevents the large majority of them from utilizing the self-funded approach, with or without the benefit of wellness and healthcare management programs.

Even though the claim reducing impact of effective wellness and healthcare management programs is definite and measurable, results do require time and certain types of claims, such as trauma or various chronic illnesses, are not susceptible to even the best wellness programs. With these persistent claim risk factors and the prospect of even higher costs in the worst case scenario of standard self-funded plan design, the large majority of mid-market companies decline on both fronts: they do not participate in proactive support of wellness with healthcare management nor do they participate in the self-funded arrangements that would enable them to benefit financially from wellness initiatives.

SUMMARY

The present disclosure describes systems and methods for both mitigating and distributing financial risk among a number of entities. Many implementations of methods that are provided in the present disclosure may be implemented by a computer. One such embodiment of a computer-implemented method includes establishing an insurance plan for one or more client groups, each client group comprising one or more members. The method also includes creating at least three layers of financial responsibility within the insurance plan. Each layer of financial responsibility defines an entity responsible for payment of insurance claims within the respective layer.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIGS. 13A-13C are flow diagrams illustrating methods of the stop loss carrier shown in FIG. 3, according to various implementations of the present disclosure.

DETAILED DESCRIPTION

Figure 1:
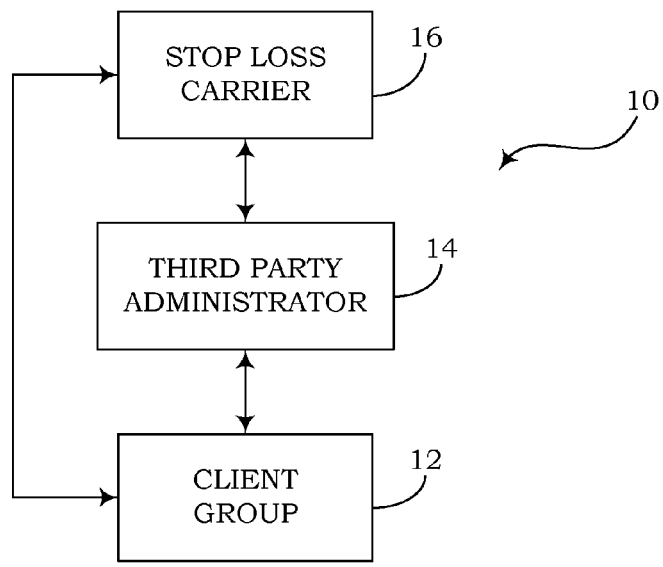
FIG. 1 is a block diagram showing a conventional stop loss insurance arrangement.
Figure 2:
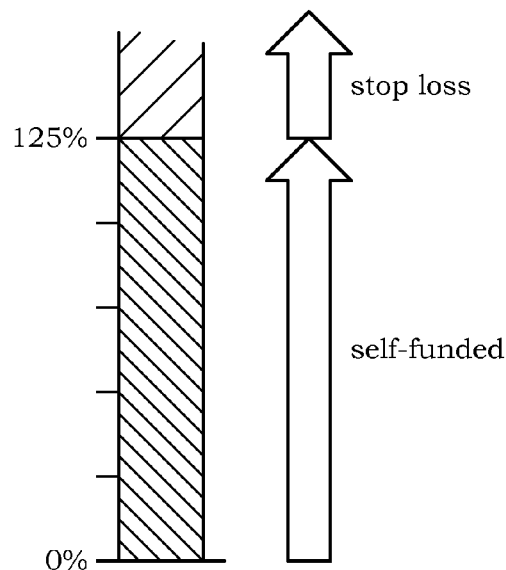
FIG. 2 is a graph showing the financial risk distribution for the conventional stop loss insurance arrangement of FIG. 1.

The present disclosure describes systems and methods for establishing the mitigation and distribution of financial risk among a number of entities. In particular, the systems and methods relate to each entity's liability for the payment of claims (e.g., medical claims) within insurance plans (e.g., health insurance plans). Financial risks are assessed to determine a scheme for distributing the risk among the entities. In addition, the total costs to a client group can be reduced by providing wellness programs that are available to the members. In some embodiments, wellness programs may be required for some or all of its members. The systems and methods herein seek to change the data interfaces associated with self-funded insurance plans in order to establish new risk/reward relationships that will strongly support and encourage Wellness and Health Management resources. Wellness Programs encourage individual participants in the healthcare plans of member companies to change health-related behaviors in ways that will improve the health of the individual participant and lower medical care expenses to the individual and to the company.

To the individuals of a member company, wellness methods and systems may be configured to provide healthcare-related education services, coaching, counseling, incentive services, and follow-up services. One or more of these services are at least partially dependent upon an individual's health profile and thus are specific to the individual. Such wellness programs may include personal counseling with an individual to aid in weight loss measures, smoking cessation, control of chronic health conditions such as diabetes, high blood pressure, Metabolic Syndrome, or other health related issues of concern. Actions by the individual may be conveyed, for example, via the Internet to a website, or by other means of communication, to a counselor, and such data may be stored on a computer. The individual's progress or maintenance is monitored and such data is added to a database to provide an overall and continuous assessment of the individual's health status. Information incorporated in an individual's health status assessment may be provided to the database by physician records, pharmacy purchases, health plan claims activity, or other sources that provide information regarding an individual's status.

The insurance plans described in the present disclosure may be especially beneficial for managing healthcare risk for mid-market employers (e.g., employers having from 50 to 750 employees). The systems and methods described herein are configured to utilize actuarial data structures which facilitate and encourage the integration of employer-sponsored Wellness Programs with a novel form of self-funded health insurance coverage. The present technology may use computer-implemented methods, computer systems, and software for managing, monitoring, and computing a self-funded risk, a shared risk, and a transferred risk element as they relate to the costs and continuous risk assessment of healthcare costs for one or more years. The insurance plans described herein may be able to change the risk/reward ratio inherent in self-funded health insurance plans so that the financial risk and volatility are reduced while the financial reward potential continues with little or no change.

The systems and methods described herein may be capable of collecting, manipulating, and transmitting data related to health conditions of individuals in member companies to establish an actuarially significant pool of data for the member companies which may reflect a positive correlation between a cultural emphasis on wellness and healthy lifestyles and a reduction, or a reduction in the rate of increase, in health insurance costs. In many cases, a company may not be large enough for its own claim results to be fully statistically significant for premium rating purposes. As a result, the premium rates for these companies are, year after year, calculated with major actuarial emphasis on "manual" rates (i.e., premiums appropriate to the general population without reference to the specific claim results of the group). As a result, successful claim performance has only limited benefit to "mid-market" companies under fully insured health plans. Only a fraction of the rate setting calculation is based on the favorable claim data and the balance is driven by much higher regional or national medical cost inflation data. In addition to this dilution of favorable results is the fact that any positive impact that may occur is deferred to the 12 month premium cycle following the year of favorable claims. Together these factors create a significant disincentive for fully-insured mid-market employers to incur the effort or expense required to launch and maintain a meaningful wellness program.

The problem of diluted and delayed financial incentives in connection with successful wellness initiatives can be alleviated by a partially self-funded plan method and system, according to the embodiments described in the present disclosure. Partially self-funded methods and systems of the present technology may include a "pay as you go" method by which the company funds its own group's claims, month by month. In addition, this payment is protected by the purchase of casualty insurance or "stop loss" coverage.

Figure 3:
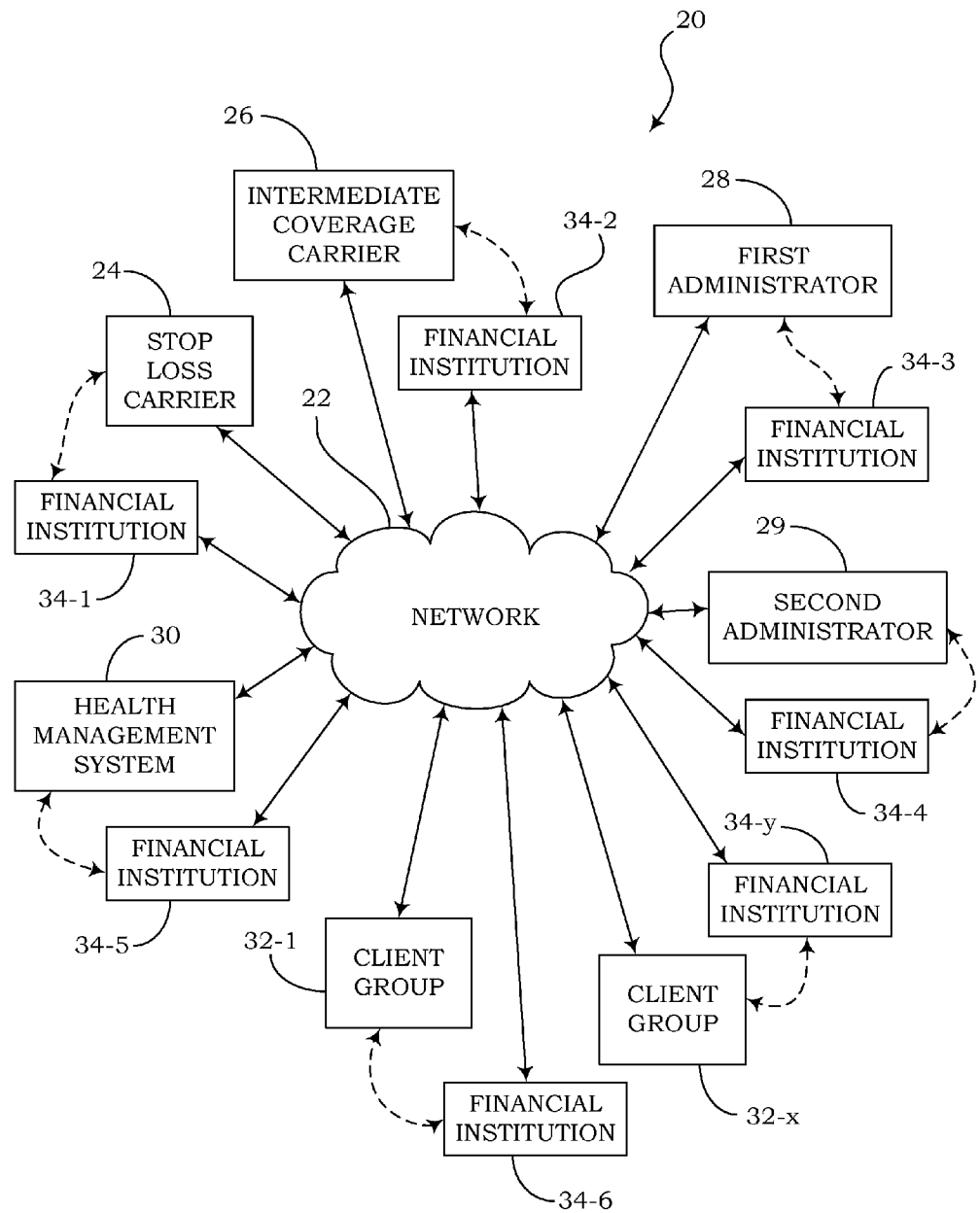
FIG. 3 is a block diagram illustrating an insurance system, according to various implementations of the present disclosure.

FIG. 3 is a block diagram illustrating an embodiment of an insurance system 20 in accordance with the present disclosure. In this embodiment, the insurance system 20 comprises a network 22, a stop loss carrier 24, an intermediate coverage carrier 26, a first administrator 28, a second administrator 29, and a health management system 30. In addition, the insurance system 20 may include any number of client groups 32-1, 32-2 . . . 32-x. Associated with each entity of the insurance system 20 (i.e., the stop loss carrier 24, intermediate coverage carrier 26, first administrator 28, second administrator 29, health management system 30, and client groups 32) is a respective financial institution 34-1, 34-2 . . . 34-y. The network 22 may comprise any type of wired or wireless components for enabling data communication and financial wire transfers among the various entities. In some embodiments, the network 22 may represent the Internet or other local or wide area network.

The stop loss carrier 24, intermediate coverage carrier 26, first administrator 28, second administrator 29, health management system 30, and clients 32 may each utilize any suitable type of computer system, as described below, capable of communicating with the other entities via the network 22. In addition, the computer systems of the various entities may be configured to authorize the transfer of funds from their associated financial institution to the financial institution of another entity.

Within the insurance system 20, three entities bear the financial risk of the healthcare coverage, namely, the stop loss carrier 24, intermediate coverage carrier 26, and the client groups 32. The health management system 30 is utilized to provide wellness services to the client groups 32. Thus, the information processes involved may be considered to fall into two zones: a Health Management zone and a Risk Management zone.

The insurance system 20 includes a form of Aggregate Stop Loss (ASL) coverage referred to herein as "Low Attachment Refunding Aggregate" (or "LARA"). This ASL coverage provided by the stop loss carrier 24 sets an attachment point lower than the typical 125% of expected claims. For example, the attachment points for LARA may have a range from about 50% to about 120% of expected claims. For ease of discussion, many embodiments at 100% of expected claims will be described in the examples and discussion herein.

The intermediate coverage carrier 26 is configured to reinsure the risk for the program, specifically the ASL risk for each member company from the attachment point (e.g., 100%) up to a second level (e.g., 125%), referred to herein as an "intermediate layer." The insurance policy available to the client groups 32 (e.g., member companies) includes membership in both the stop loss coverage and membership in a mutual captive insurance company (the intermediate coverage carrier 26), which reinsures, from the stop loss carrier 24, the intermediate layer. The intermediate coverage carrier 26 sets up a financial account for each client group 32 that may be a repository for both premium and capital contributions paid into a "Captive Pool," which is a collection of all contributions to the accounts by the client groups 32. Each account for the respective client groups 32 represents, at the end of each plan year, a full annualized amount of the client group's responsibility equal to the percentage of actuarially expected claims between the intermediate carrier's ASL threshold (e.g., 100%) and the stop loss carrier's ASL threshold (e.g., 125%). The total dollar value of the Captive Pool is based on the number of employees and other factors.

In some embodiments, the Captive Pool aids in reducing the financial risk and volatility of self-funding health insurance and allows for the positive actuarial selection to be spread among the various client groups 32. Each client group 32 shares in the net claims payable during each plan year in the intermediate layer. Information regarding the respective monthly value of each client group's total expected claims amount, as reflected in each group's base rates and their monthly changes in enrollment, may be downloaded to the client groups 32 from the second administrator 29. The first administrator 28 administers the health benefit plan on behalf of the client group, providing enrollment record keeping, claims payment and other services. This enrollment-driven calculation will be used to electronically determine the pro-rata percentage of each client group's current month share of total intermediate layer contributions. This will then be applied to calculate each client group's share of any claims payable in the intermediate layer that month. At the same time, these monthly changes in enrollment also determine an Aggregate Attachment Point, which, through the LARA, may be equal to 100% of expected claims, a figure that, actuarially, is close to the number utilized in developing fully-insured premium rates. Thus, members may have a maximum liability at, or near, their standard fully-insured optional cost while participating in a program that allows them to capture dollar-for-dollar savings in the event of favorable claims totals.

The insurance system 20 of the present disclosure provides healthcare insurance programs which include, but are not limited to, personal health risk assessments, on-site or clinic-based biometric screenings, detailed individual risk analysis, and live interaction with health coaches and/or counselors. Some entities, such as the administrator 28, may access state-of-the-art predictive modeling and risk analysis software employed in the claims payment process. Counseling sessions may take place at a business site, or at another location, and may be conducted in personal interviews or by remote communication methods such as video conferencing, email, telephone, or other means of communication via the network 22.

As illustrated in the embodiment of FIG. 3, the insurance system 20 includes two administrators (i.e., the first administrator 28 and the second administrator 29). The first administrator 28 may be configured for paying claims and coordinating claim information. According to this implementation with two administrators, the first administrator 28 may be arranged through carriers such as BlueCross BlueShield, Aetna, Cigna, United Healthcare, or others, which may also provide their own proprietary medical provider network. The second administrator 29 may be configured for coordinating captive claim activities, billing, disbursing funds, and other tasks and may be an independent TPA.

The administrators 28, 29 may comprise state-of-the art medical risk analysis and predictive modeling software as a concurrent process with claim payment. This information guides continuous programs of disease management and health risk interventions. Data sharing between the administrators 28, 29 and the health coaches of the health management system 30 further enhances the coaching process. The creation of a personal health record for the members of the client groups 32 may be an aspect of the present technology in which information from the administrators, health risk assessment, and biometric screening data generated through the Wellness Program and ongoing data from coaches may be made available to the individual participants' primary care physician.

In some embodiments, the first administrator 28 and second administrator 29 may be combined into one administrator that oversees the administrative responsibilities of both entities. According to other embodiments, the administrators may be optional. In still other embodiments, one or both of the administrators 28 and 29, or parts thereof, may be incorporated within another entity of the insurance system 20, such as the stop loss carrier 24, intermediate coverage carrier 26, health management system 30, or alternatively, may be incorporated in each of the client groups 32.

The present disclosure may be embodied in multiple configurations with regard to administrative plan services. The administrative services may be divided into two or more categories. As described below, the present disclosure may include a configuration in which the program may access the Medical Provider Networks of a national, proprietary (with regard to network) company as well as the claims administration services of the company. These functions may be handled by an Administrator "A". At the same time, all other functions of data gathering, reporting, billing, reconciliation of bills, procurement of proposals from both carriers and administrators and other services are conducted by a second organization (Administrator "B").

Administrator A (e.g., administrator 28) may be configured to 1) provide access to the discounts and other services of a proprietary network or networks of medical care providers; 2) pay claims for expenses incurred by members of the health plan; and 3) report claim data to the client groups, stop loss carrier, a personal medical record portal, the employer and any others who are HIPAA certified to receive such information. Administrator A is further configured to 4) coordinate large claim information with the stop loss carrier delivering timely information regarding high claimants and any who are claim-eligible; 5) adjudicate appeals presented by members regarding contested claim payment action; 6) maintain accurate and timely enrollment records and a system for reporting them; 7) issue bills on a monthly basis for medical administration services, COBRA and other ancillary administrative services, and claims and large case management; and 8) facilitate the payment by the client of amounts due for payment of claims incurred under the plan through whatever banking arrangements are expedient.

Administrator B (e.g., administrator 29) may be configured to perform duties with respect to 1) RFP (Request for Proposal) intake, such as reviewing RFP data for adequacy and contact broker for any missing information; 2) stop loss quote procurement, such as forwarding, with any necessary additions, to all eligible or indicated stop loss carriers the full RFP data and follow said submission to ensure timely return of quotation information; and 3) administrative quote procurement, such as forwarding, with all necessary additions, to all eligible or indicated administrators the full RFP data and follow said submission to ensure timely return of quotation information. Administrator B is also configured to 4) generate and follow-up on billing for all services not covered under the Administrator A services, some, but not all of which include stop loss premiums, captive insurance company deposits, broker or other commissions, and fees; 5) receive bills from Administrator A for some or all of services of Administrator A and incorporate them into a single comprehensive billing; 6) track the aggregate claim status for each group under the plan and process all aggregate claims promptly through the captive and the stop loss carrier as appropriate; and 6) monitor and ensure the claims data transfer each month from Administrator A to Administrator B of complete claim records for all client accounts and process these to the captive insurance carrier for monthly distributive accounting for any claims incurred within the intermediate layer.

Administrator B is further configured to 7) complete all vendor payments on a monthly basis through disbursement of funds received in the billing process, which may include payments to the Wellness Management company with funds accessed through the claims payment system, payments to the broker of commissions or per head fees or a combination of the two, remittance of fees for the captive manager, remittance of fees and/or commissions to the program manager; and 8) receive "data drops" including detailed claim data from Administrator A which will be allocated to the Personal Health Records of members, periodic executive summaries for communication of financial status to client management groups and other purposes.

In the embodiment of the present disclosure in which a single administrator is contracted for plan services, all of the above-mentioned activities and duties will be the responsibility of that single entity.

In providing insurance to cover claims in excess of a first percentage level (e.g., 100% attachment point), the LARA has two distinct elements. The first element (i.e., a premium) comprises funds actuarially calculated for handling claims which fall between the first percentage level (e.g., 100% of expected claims) and a second percentage level (e.g., 125% of expected claims). The second element comprises funds for handling claims above the second percentage level (e.g., 125%). In order that the total intermediate layer risk is fully collateralized, an additional funding component (i.e., the capital contributions) is made by each client group 32 as a participating member/owner of the mutual captive company. The total premium for the LARA will consist of the sum of the costs for both elements. For example, the costs for the first element are computed as a fraction of the total dollar value, which is the intermediate layer. The costs for the second element may be the costs for conventional aggregate stop-loss coverage at a 125% attachment point. Participating client groups 32 may pay the LARA costs in cash. The balance of the intermediate layer is funded (i.e., collateralized) with mutual member capital contributions. While its premium computation and administration refer to "layers," the offer of LARA coverage to participating companies in the insurance system 20 may be made as a unitary premium for the transfer of risk at the designated LARA attachment point. This exchange of premium and risk will be made through the primary stop-loss carrier 24.

The stop-loss carrier 24 will subsequently retain some of the risk and premium and reinsure, through the intermediate coverage carrier 26, the risk covering the intermediate layer. For all participating companies, the premiums due for the LARA are aggregated to form a risk distribution pool (i.e., the Captive Pool). This Captive Pool represents a risk sharing component for the client groups 32 of the present technology. Each company will have a separate account within the Captive Pool based on its own premium contributions and respective share of expenses. During each member company's active participation in the plan, the Captive Pool will represent a reserve from which insurance reimbursements will be paid to member companies for claims in excess of the attachment point (e.g., 100% of expected claims) and less than the second percentage level (e.g., 125% of expected claims). To the extent that such claims exceed the 125% threshold, the claims will be reimbursed by the primary stop-loss carrier 24 under the second element coverage. Claim charges (as well as any premium taxes and Captive Pool operating expenses) will be distributed among the member companies' accounts on a pro-rata basis relative to group and premium size.

Expenses may be distributed within the Captive Pool and/or charged directly to the client groups 32. Each member company will have an interest in their respective Captive Pool accounts represented by rights to policyholder distributions. Captive Pool assets will be distributed to member companies upon their termination of participation in the plan. The rights to a disbursement may be determined by the initial agreement for becoming a member of the program and establishes the member company's contractual right to the surplus premium in their account upon termination.

Once the Captive Pool account has been established and funded in the first year through a combination of premiums and capital contributions, second and subsequent year's premiums and contributions may be reduced by amounts of surplus premiums and capital remaining in the Captive Pool, which can be credited to the client groups 32 in the form of dividends and by remaining capital account balances. After credit for premium dividends and continuing capital account balances, premiums and/or additional capital contributions in the subsequent years may be needed in an amount that will restore each Client Company's account to full funding of the first element LARA percentage (e.g. 25% of annual expected claims). These premium and capital amounts reflect insurance claims and other expenses paid by the Captive Pool during the preceding year, which reduces the client group's Captive Pool account balance. The premium and capital amounts also reflect actuarial adjustments made to the expected claims amount in each member's annual stop-loss contract renewal process, which, in general, will include an increase in the stop loss carrier's estimate of expected claims and, therefore, an increase in the Captive Pool required amount (e.g., 25% of expected claims).

The aspects of risk management among the entities of the insurance system 20 are now described. Using various electronic systems that organize and store data and software algorithms that perform actuarial risk analysis (i.e., underwriting), premium rating data is developed and premium rates and factors are set by the stop loss carrier 24. Data collected for this purpose include, among other things, computer spreadsheet records, preferably, of a particular group's aggregate claims history (e.g., group totals month by month), large claim activity on particular individuals including diagnosis and paid claim amounts, census data indicating the age, gender, dependant coverage status, residence zip code (indicative of geographical medical pricing zones) and other information. Acquisition by the stop loss carrier 24 of the required underwriting data may be accomplished through electronic transfer of records from the client groups 32, prior stop loss or fully insured group health carriers, a TPA, or a combination of these entities. The data transfer may be directed to the stop loss carrier 24 by a group health insurance broker. Results of the rating analysis include premium rates for both specific and aggregate stop loss coverage and an aggregate stop loss attachment factor (e.g., representing 100% of the expected aggregate claims). The stop loss carrier 24 transmits these results via the network 22 to the intermediate coverage carrier 26, administrators 28, 29, and client groups 32.

Each of the client groups 32 may include a computer system having a database for storing records of employees or members. Using a database that is regularly updated for employee enrollment, the client group 32 is configured to transmit data (e.g., monthly) to a database associated with the first administrator 28. The first administrator 28 includes means for managing the database to maintain electronic eligibility and participation records.

The first administrator 28 is configured to compile electronic paid claim registers which reflect the net amounts paid by the client group's plan for each participant and all participants combined. The first administrator 28 may then transmit this information to the client group 32 along with instructions to initiate wire transfer funding for claims equal to or less than the first level (e.g., 100%) of aggregate cumulative expected claims. This communication is different from current standard self-funded systems, which have a higher level of cumulative claim funding requirement (e.g., an aggregate attachment point of 125% of the expected claims). The insurance system 20 may be distinct, among other reasons, in its application of an insured stop-loss attachment point of 100% of expected claims, according to one implementation. This distinction is also noted in other aspects described through the present disclosure.

The second administrator 29 may include a computer system that is configured to store software for performing multiplicative calculations based on each group's enrollment and unique premium rates and aggregate attachment factors to determine total premium owed and the aggregate attachment point for each group. The second administrator 29 transmits these results via the network 22 to update similar databases within the insurance system 20 maintained by the stop loss carrier 24 and the intermediate coverage carrier 26.

Payments of premium and administration fees for services are billed by the second administrator 29 to each client group 32. The entities may establish automatic payment transfers for paying these amounts monthly. Capital contributions may be paid by each client group through the second administrator 29, which may be configured to forward these contributions to the intermediate coverage carrier 26 to be held as reserves.

As needed, members of the client groups 32 can access medical care and pay deductibles for services. The first administrator 28 is configured to transfer funds to the medical service provider, which may be a component of the health management system 30, to pay any remaining balance. The first administrator 28 will then seek reimbursement for the medical costs.

In the event of aggregate claim activity on the part of any client group 32 in excess of the first percentage level (e.g., 100%) of expected claims, the second administrator 29 transmits the electronic claims report (current month and year-to-date activity) and an electronic stop loss claim notification to the stop loss carrier 24 for claims in excess of the first percentage level. The second administrator 29 may also transmit the electronic claims report (current month and year-to-date activity) and an electronic stop loss claim notification to the intermediate coverage carrier 26 for claims in excess of 100% of expected. This optional transmission may be an advance notice and confirmation of a reinsurance claim that will be submitted to the intermediate coverage carrier 26 by the stop loss carrier 24.

In response, the stop loss carrier 24 initiates an electronic transmission of reinsurance claim notification to the intermediate coverage carrier 26 for reimbursement of claims within the intermediate layer (e.g., 100% to 125%). The intermediate coverage carrier 26 verifies electronic eligibility and claim liability data in its database and, once confirmed, initiates the electronic transfer of funds to the stop loss carrier 24 for payment of the intermediate layer claims.

Then, the stop loss carrier 24 verifies electronic eligibility and claim liability data in its database and transmits funds to the first administrator 28 for claims in excess of the first percentage level (e.g., 100%). This amount includes amounts received from the intermediate coverage carrier 26 as well as amounts in excess of the intermediate layer and included in a stop loss layer, which include claims that are the liability of the stop loss carrier 24.

The intermediate coverage carrier 26 may employ customized financial software to compile an integrated monthly database of claims activity and claim liability factors for the client groups 32. This database represents the sum of all eligibility, premium rate, and aggregate attachment factors, and other associated financial data. Electronic formulas, based on prorating a current month's eligibility and liability factors, are applied within the database to determine each group's respective share of intermediate layer claims and costs. Intermediate layer claims are paid first from accumulated premium payments and secondly, if necessary, from accumulated capital contributions. The intermediate coverage carrier 26, as a fully collateralized risk pool, allocates risk and claim costs in a specific risk corridor among member companies of a mutual (not for profit) pure risk distribution entity.

The results of the calculations by the intermediate coverage carrier 26 are transmitted monthly to each client group 32 for information purposes and, at plan year-end, as notification of year-end dividend transactions. Each client group's share of any surplus in the premium portion of their Captive Pool account is credited as a dividend and applied toward their renewal premium for aggregate stop loss coverage in a renewal rating process described below. Formula-driven electronic calculations are applied in order to modify premium rates and intermediate layer capital contribution requirements so as to target each year's Captive Pool contribution toward a total representing a predetermined percentage (e.g., 25%) of expected claims.

The stop loss carrier 24 compiles a database of claims activity to establish normative, per-member-per-month actuarial information illustrative of claim trends within the global membership of all client groups 32 in the insurance system 20. This data is electronically applied to the stop loss rating algorithms as a rating factor specific to the insurance plan described in the present disclosure. Data in the insurance system 20 may be exclusively applied (e.g., particularly in second and subsequent years) to the actuarial and underwriting purposes of client groups 32. Continuous required participation in the Health Management program associated with the insurance system 20 by all member companies (when applicable in various implementations) means that the impact of the Health Management is reflected in 100% of the claims and other health risk related data generated by the client groups 32. This is in contrast to any standard carrier's block of business in which the percentage of clients maintaining meaningful health management activity is generally quite small.

Aspects of health management are now described. The health management system 30, which has proprietary access to a health management host website, creates a personalized webpage for each plan participant (i.e., employees and/or dependants). The individualized webpage may include an electronic Health Risk Assessment (HRA), which is a detailed health history questionnaire designed to identify health risk factors based on heredity, lifestyle, behavior, or previous medical issues. Each plan participant registers online and records personal and family medical history in a protected electronic portal. This information may then be available to health management coaches, who are scheduled to provide wellness related advice and encourage positive behavior to maintain and/or improve healthy lifestyles.

Each plan participant may also complete a live biometric screen which produces current data on blood chemistry, body mass index, blood pressure, and other vital health indices. This data is recorded electronically in the portal of the health management system 30.

The HRA and biometric data may be subjected to a system of software-based risk assessment analysis which records health risk status within several evaluation categories. The data and risk status assessment remains in a password protected website associated with the portal. Each individual's data may be updated and reanalyzed regularly throughout the duration of the insurance coverage through electronic priority authorizations granted to persons directly involved in the health coaching process as part of the health management system 30 team and those with electronic information management responsibilities. All policies and procedures required for compliance with HIPAA will be maintained.

Coaching input and recommendations may be communicated both live to the plan participant and as a digital record in the portal which has software components to constantly update risk factors. All activity and progress for the health and lifestyle initiatives undertaken by the plan participant and the coach may be electronically recorded in the portal.

Wellness programs of the health management system 30 offer a robust combination of health evaluations, early detection of diseases, risk assessment for future illness, risk reduction by enabling behavior change. Services are focused on improvement in the areas of obesity, excessive stress, high cholesterol, tobacco use, sedentary lifestyle, elevated blood sugar, increased blood pressure, unhealthy diet, and others.

The wellness services may consist of multiple steps which may include: 1) A Health Evaluation which may include a health questionnaire and biometric screening, the identification of "high risk" individuals, a personal communication of a Health Status Report through a personal meeting or conversation with a health coach lasting approximately 30 minutes, an organizational aggregate report of the health status for the entire group to the client management; 2) Weekly Onsite Coaching (or other frequency coaching which takes place for one or more months during the year) which may include: One-on-one meetings with a personal health coach to develop an individual plan to manage health risks; a plan which may include measures to improve nutrition and weight, stress management; regular exercise and tobacco cessation; 3) Group programs and presentations to multiple members of the employer group to address weight loss, tobacco cessation, diabetes management and other subjects; 4) The re-testing of high risk employees or family members to assess progress and the provision of an outcomes report documenting the clinical results; 5) Health education and promotion through ongoing coaching; the installation of a website featuring information beneficial to the progress of group members in their process of health improvement; monthly information sessions on health improvement topics; quarterly competitions and challenges which promote healthy behavior; and 6) Incentive programs including gifts, recognition, enhanced health benefits, financial rewards and other forms of encouragement may be used to promote both participation in the wellness program as well as attainment of positive health goals established by individual members in the course of their participation.

The first administrator 28 is configured to utilize sophisticated software programs designed to identify health risks and their intensity based on the specific nature of the claims which the system administers for each plan participant. Digital information reflecting diagnostic codes, procedure codes, prescription drug codes, and other codes, along with risk analysis based on electronic predictive modeling algorithms, which may be collected by the first administrator 28 in the process of paying claims, are downloaded to a database associated with the health management system 30 in order to increase the insight and effectiveness of the coaching process.

The aggregate of the data described with respect to the HRA, biometric screening, and coaching may be downloaded to a Personal Health Record (PHR) database associated with the health management system 30. This PHR database may reside in a separate web-based facility which may be established by the health management system 30 as an information repository separate from the proprietary portal and website. The PHR database may be designed specifically for access and interaction with the various medical care professionals who may provide care to a given plan participant. Information in the PHR, through a protected Internet application, may be shared with the plan participant's primary care physician (PCP). In addition, through a web-based interface, the PCP may contribute to the digital record with history, diagnosis, and other information.

Aggregate electronic data may include overall percentages of health risks within the client group's members. Changes in the frequency and degree of risk over time will be transmitted regularly to the client group 32 from the health management system 30.

The fees for Health Management services by the health management system 30 may be paid through the self-funding system using a wire transfer process in associated with the financial institution 34 associated with the health management system 30. The health management system 30 may transmit to the stop loss carrier 24, in conjunction with initial and renewal rate calculations, the per capita fees to be charged for their services. Per program agreements, and in consideration of the fact that the return on investment of these fees in terms of overall claims reduction is equal to or greater than 1, this data, and in particular the monthly dollar volume that it represents, may be electronically incorporated into the aggregate attachment factor calculation as the equivalent of a medical claim.

It should be noted that other systems, methods, models, and electronic communication formats of the health management services and programs may be added to or substituted for the aspects of the models and formats described herein. The insurance program of the insurance system 20 will require that wellness services be maintained continually by at least a certain percentage of the members of each client group 32.

Figure 4:
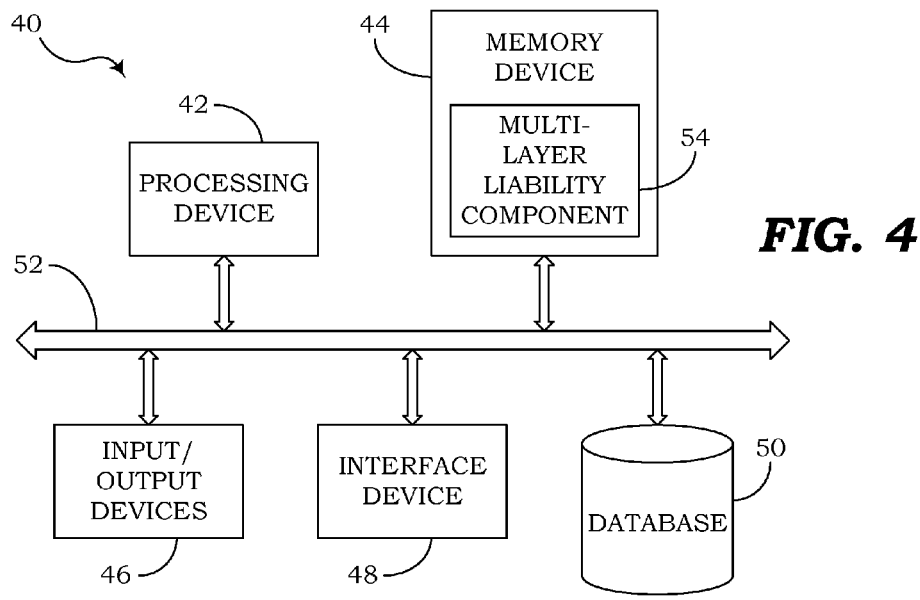
FIG. 4 is a block diagram of a computer system incorporated in each of the stop loss carrier, intermediate coverage carrier, administrator, information management system, and client groups shown in FIG. 3, according to various implementations of the present disclosure.

FIG. 4 is a block diagram showing an embodiment of a computer system 40. The computer system 40 may represent any of a number of computer systems associated with the stop loss carrier 24, intermediate coverage carrier 26, first administrator 28, second administrator 29, health management system 30, and client groups 32 shown in FIG. 3. As illustrated in this embodiment, the computer system 40 includes a processing device 42, a memory device 44, input/output devices 46, an interface device 48, and a database 50, each interconnected with each other via a bus interface 52. The memory device 44 comprises, among other things, a multi-layer liability component (MLLC) 54. The MLLC 54 may include computer software or other forms of logical instructions. The MLLC 54 is configured to perform various functions based on the particular computer system in which it is incorporated. For example, the MLLC 54 of the stop loss carrier 24 includes at least the logic for the performance of the functions of the stop loss carrier 24; the MLLC 54 of the intermediate coverage carrier 26 includes at least the logic for the performance of the functions of the intermediate coverage carrier 26; and so on. According to various embodiments of the present disclosure, the computer system 40 is configured to perform the functions described below.

The processing device 42 may be a general-purpose or specific-purpose processor or microcontroller for controlling the operations and functions of the computer system 40. In some implementations, the processing device 42 may include a plurality of processors each designed for performing different functions within the computer system 40.

The memory device 44 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc.

The input/output devices 46 may include various data entry mechanisms and data output mechanisms. The data entry mechanisms may include, for example, keyboards, keypads, buttons, switches, touch pads, touch screens, cursor control devices, computer mice, stylus-receptive components, voice-activated mechanisms, microphones, or other data input devices. The data output mechanisms may include, for example, computer monitors, display screens, touch screens, speakers, buzzers, alarms, notification devices, lights, light emitting diodes, liquid crystal displays, visual display devices, audio output devices, printers, or other data output devices. In some embodiments, the input devices and output devices may also include mechanisms configured to receive input and provide output, such as interaction devices, dongles, touch screen devices, and other input/output mechanisms, to enable input and/or output communication.

The interface device 48 is configured to enable communication between the computer system 40 and the network 22. The interface device 48 may include modems (e.g., cable modems), routers, and/or other devices for transmitting data or information between the computer system 40 and other end user devices of the network 22. Other computer systems 40 may be connected directly or indirectly to the network 22, thereby allowing each of the computer systems 40 to communicate with other systems.

The database 50 may include any suitable type of database for storing tables and information and may be used to store any type of data. The type of data stored in the database 50 may be a factor of the entity of the insurance system 20 in which the computer system 40 is incorporated. The MLLC 54 or other component of the computer system 40 may also include a database management system for organizing the data that is stored in the database 50.

The MLLC 54 of the present disclosure may be implemented in hardware, software, firmware, or any combinations thereof. In various implementations, logical instructions, commands, and/or code can be implemented in software, firmware, or both, and stored in the memory device 44. In this respect, the logic code may be implemented as one or more computer programs that can be executed by the processing device 42. As illustrated in FIG. 4, the MLLC 54 is implemented in software or firmware that is stored on the memory device 44 and may be executed by the processing device 42. According to other various embodiments, the MLLC 54 may be implemented in hardware (e.g., in the processing device 42) using discrete logic circuitry, an application specific integrated circuit (ASIC), a programmable gate array (PGA), a field programmable gate array (FPGA), or any combinations thereof.

The MLLC 54 may comprise an ordered listing of executable instructions for implementing logical functions. This program may be embodied in any computer-readable medium for use by an instruction execution system or device, such as a computer-based system, processor-controlled system, etc. The computer-readable medium may be any medium that can contain, store, communicate, propagate, or transport programs for execution by the instruction execution system or device. The computer-readable media may include one or more suitable physical media components that can store the software, programs, or computer code for a measurable length of time.

Figure 5:
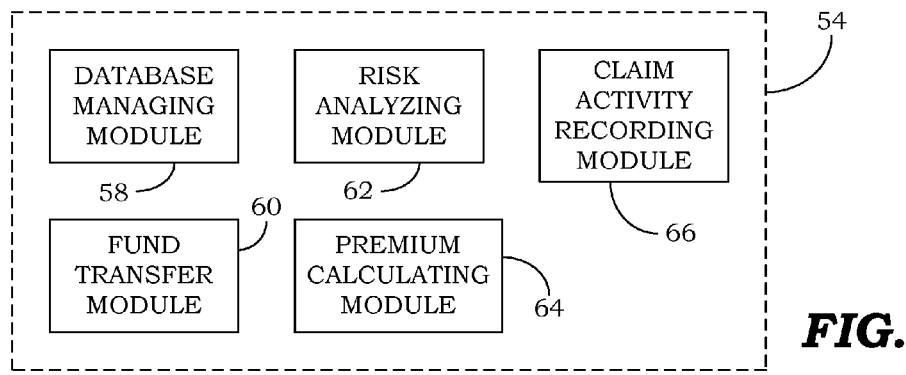
FIG. 5 is a block diagram of the multi-layer liability component shown in FIG. 4 and incorporated in the computer system of the stop loss carrier shown in FIG. 3, according to various implementations of the present disclosure.

FIG. 5 is a block diagram showing a first embodiment of the multi-layer liability component (MLLC) 54 shown in FIG. 4. In this embodiment, MLLC 54 is incorporated in the computer system of the stop loss carrier 24 shown in FIG. 3. The MLLC 54, as illustrated in FIG. 5, includes a database managing module 58, a fund transfer module 60, a risk analyzing module 62, a premium calculating module 64, and a claim activity recording module 66.

The database managing module 58 is configured to manage the data that is to be stored in the database 50 of the computer system 40 associated with the stop loss carrier 24. The database managing module 58 is also configured to store and/or retrieve data from the database as needed. The fund transfer module 60 is configured to manage the transfer of funds between the financial institution 34 associated with the stop loss carrier 24 and the other entities' financial institutions 34.

The risk analyzing module 62 is configured to collect data of the client groups' claim history, large claim activity, paid claim amounts, census data indicating age, gender, dependant coverage status, geographic pricing zones, and other information. From this data, the risk analyzing module 62 is able to analyze the financial risk involved with insuring each of the client groups. The premium calculating module 64 may be related to the risk analyzing module 62 and may be configured to use the risk analysis results to calculate the premium amounts for the members within each client group. The premium calculating module 64 may calculate rates for both specific stop loss coverage and aggregate stop loss coverage. The claim activity recording module 66 is configured to record the medical claims that fall within the various layers. This information may also be used by the premium calculating module 64 for renewal purposes.

Figure 6:
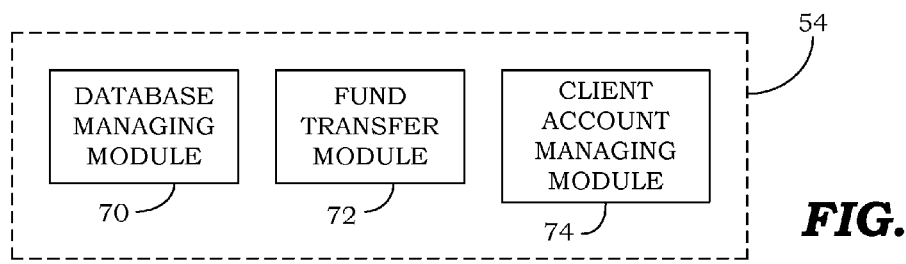
FIG. 6 is a block diagram of the multi-layer liability component shown in FIG. 4 and incorporated in the computer system of the intermediate coverage carrier shown in FIG. 3, according to various implementations of the present disclosure.

FIG. 6 is a block diagram showing a second embodiment of the MLLC 54 shown in FIG. 4. In this embodiment, MLLC 54 may be incorporated in the computer system of the intermediate coverage carrier 26 shown in FIG. 3. The MLLC 54, as illustrated in FIG. 6, includes a database managing module 70, a fund transferring module 72, and a client account managing module 74.

The database managing module 70 is configured to manage the data that is to be stored in the database 50 of the computer system 40 associated with the intermediate coverage carrier 26. The database managing module 70 is also configured to store and/or retrieve data from the database as needed. The fund transferring module 72 is configured to manage the transfer of funds between the financial institution 34 associated with the intermediate coverage carrier 26 and the other entities' financial institutions 34.

The client account managing module 74 is configured to compile monthly data of claim activity and claim liability factors for the client groups. When medical claims fall within the intermediate layer in which payment of the claims is the responsibility of the intermediate coverage carrier, the claims are paid from accumulated premium payments and then, if necessary, paid from accumulated capital contributions. For example, if a $10,000 claim within the intermediate layer is paid from funds in the Wellness Pool, the account of each client group is deducted on a pro-rated basis. If one client group represents 3.5% of the membership, an amount of $350 is deducted from the client group's account.

Figure 7:
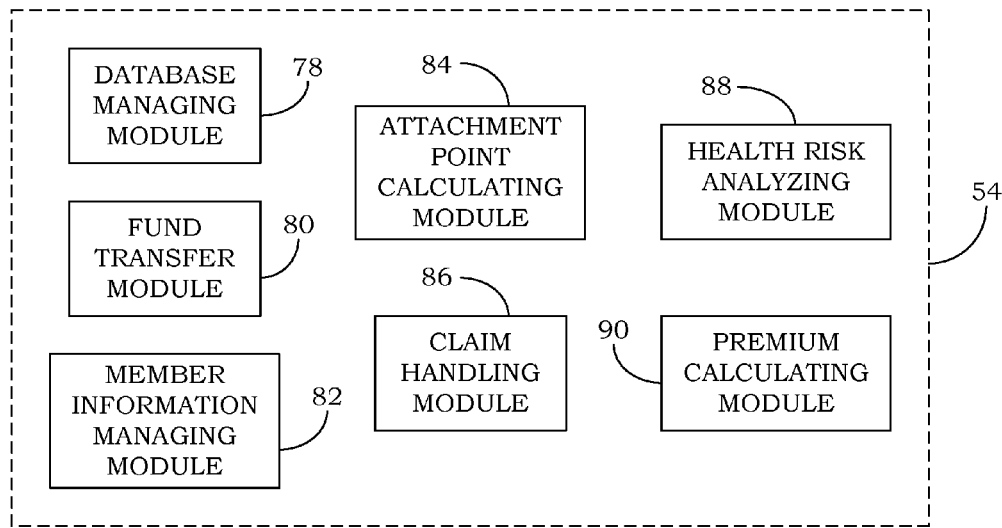
FIG. 7 is a block diagram of the multi-layer liability component shown in FIG. 4 and incorporated in the computer system of the administrator shown in FIG. 3, according to various implementations of the present disclosure.

FIG. 7 is a block diagram showing a third embodiment of the MLLC 54 shown in FIG. 4. In this embodiment, MLLC 54 may be incorporated in the computer system of the administrator 28 shown in FIG. 3. The MLLC 54, as illustrated in FIG. 7, includes a database managing module 78, a fund transfer module 80, a member information managing module 82, an attachment point calculating module 84, a claim handling module 86, a health risk analyzing module 88, and a premium calculating module 90.

The database managing module 78 is configured to manage the data that is to be stored in the database 50 of the computer system 40 associated with the administrator 28. The database managing module 78 is also configured to store and/or retrieve data from the database as needed. The fund transfer module 80 is configured to manage the transfer of funds between the financial institution 34 associated with the administrator 28 and the other entities' financial institutions 34.

The member information managing module 82 is configured to maintain records of each member of the client groups and maintain eligibility information. Based on enrollment, the attachment point calculating module 84 is configured to determine the total amount of premium owed by each client group and the aggregate attachment point for each client group.

The claim handling module 86 is configured to manage aggregate claim activity on the part of the client groups for claims that exceed the first percentage level (e.g., 100%). The claim handling module 86 then submits these claims to the stop loss carrier for payment. The claim handling module 86 may also be configured to submit a report of these claims over the first percentage level to the intermediate coverage carrier as an advance notice and confirmation of reinsurance claims.

The health risk analyzing module 88 is configured to receive information from various health management sources about the specific nature of claims for each plan participant. The health risk analyzing module 88 may utilize predictive modeling algorithms to analyze medical diagnostic codes, medical procedure codes, prescription drug codes, and other codes collected within the medical claim process in order to accurately assess the risk factors regarding the health of the members. In addition, the premium calculating module 90 may be configured to obtain the health risk factors analyzed by the health risk analyzing module 88 to calculate premiums for the various client groups.

Figure 8:
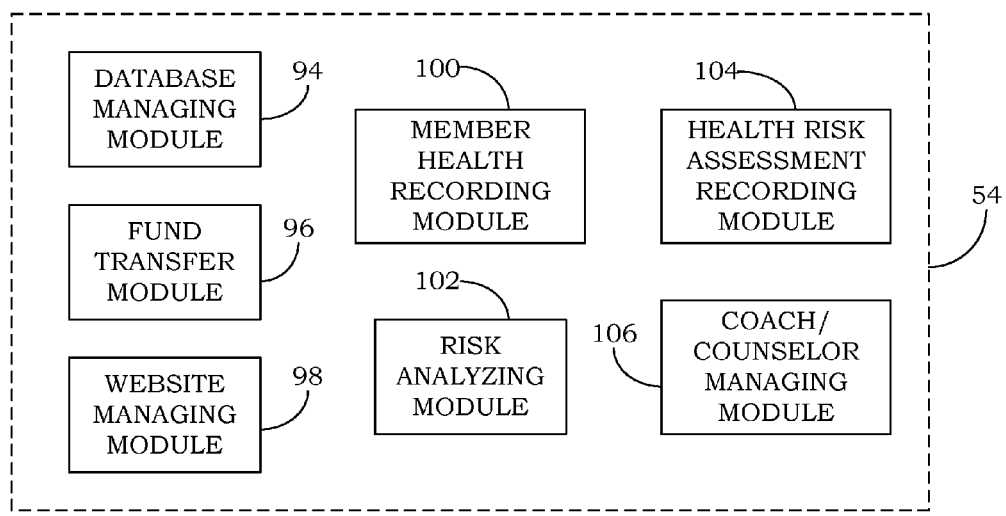
FIG. 8 is a block diagram of the multi-layer liability component shown in FIG. 4 and incorporated in the computer system of the health management system shown in FIG. 3, according to various implementations of the present disclosure.

FIG. 8 is a block diagram showing a fourth embodiment of the MLLC 54 shown in FIG. 4. In this embodiment, MLLC 54 may be incorporated in the computer system of the health management system 30 shown in FIG. 3. The MLLC 54, as illustrated in FIG. 8, includes a database managing module 94, a fund transfer module 96, a website managing module 98, a member health recording module 100, a risk analyzing module 102, a health risk assessment recording module 104, and a coach/counselor managing module 106.

The database managing module 94 is configured to manage the data that is to be stored in the database 50 of the computer system 40 associated with the health management system 30. The database managing module 94 is also configured to store and/or retrieve data from the database as needed. The fund transfer module 96 is configured to manage the transfer of funds between the financial institution 34 associated with the health management system 30 and the other entities' financial institutions 34.

The website managing module 98 is configured to host a website that may be accessed by various parties of the insurance system 20. Personalized web pages may be created for each member of the client groups for storing and providing access to Health Risk Assessment (HRA) data, heredity-based information, lifestyle and/or behavioral information that may affect health, and other information. The member health recording module 100 is configured to include a portal for allowing physicians to access and/or supplement the records of the members. The health records may be accessible using the website.

The risk analyzing module 102 is configured to analyze a risk based on records of an individual's status within several evaluation categories. The health risk assessment module 104 is configured to assess the health risk of various members based on HRA and biometric data. Other evaluations may be used for analyzing risk. Each individual's database may be updated and re-analyzed as needed throughout the duration of the coverage time periods. Updates may be made by authorized persons involved in the health of the individuals, such as physicians, health coaches, health counselors, and others.

The coach/counselor managing module 106 is configured to coordinate schedules for health coaches and counselors with individual members or for groups. The coach/counselor managing module 106 may also be configured to allow coaches and counselors to update risk factors as needed.

Figure 9:
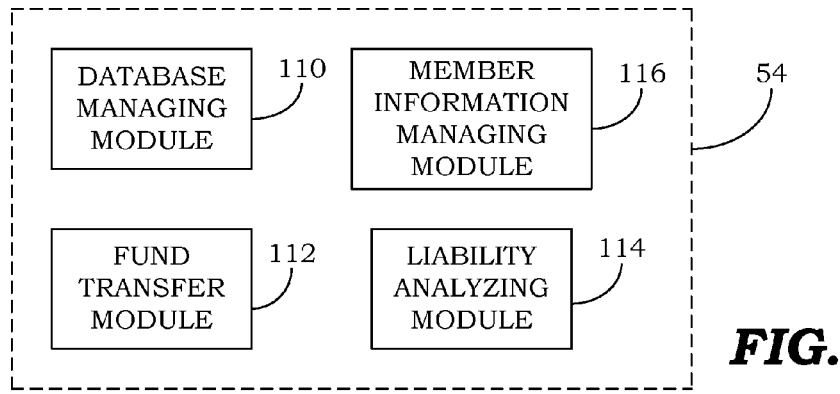
FIG. 9 is a block diagram of the multi-layer liability component shown in FIG. 4 and incorporated in the computer systems of the client groups shown in FIG. 3, according to various implementations of the present disclosure.

FIG. 9 is a block diagram showing a fifth embodiment of the MLLC 54 shown in FIG. 4. In this embodiment, MLLC 54 may be incorporated in the computer system of the one of the client groups 32 shown in FIG. 3. The MLLC 54, as illustrated in FIG. 9, includes a database managing module 110, a fund transfer module 112, a member information managing module 114, and a liability analyzing module 116.

The database managing module 110 is configured to manage the data that is to be stored in the database 50 of the computer system 40 associated with each of the client groups 32. The database managing module 110 is also configured to store and/or retrieve data from the database as needed. The fund transfer module 112 is configured to manage the transfer of funds between the financial institution 34 associated with the respective client group 32 and the other entities' financial institutions 34.

The member information managing module 114 is configured to maintain information of the members (e.g., employees) of the respective client group 32. Updates to employee enrollment may also be made as needed. Also, claim information may be stored for the members over the time periods of insurance coverage. Using this information, the liability analyzing module 116 may be configured to analyze the liability of the respective client group to verify costs for certain claims. Also, the liability analyzing module 116 may record claims that fall within the intermediate layer by every client group to determine the respective share of the liability for the intermediate coverage.

Figure 10:
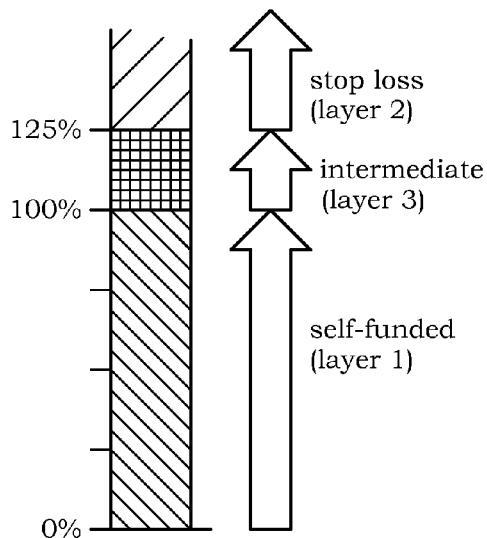
FIG. 10 is a first graph showing the financial risk distribution for an insurance plan, according to various implementations of the present disclosure.

FIG. 10 is a first graph showing a first example of a financial risk distribution for an insurance plan. For example, the financial risk distribution may be a factor of the insurance plan provided by the insurance system 20 of FIG. 3. A first percentage level in this graph represents a level that is 100% of the expected aggregate claims for a client group 32. Actuarial data may be obtained for determining this first level. In some embodiments, the actuarial data may be obtained exclusively from members of the client groups to more accurately predict the expected claim levels based on wellness factors of the members.

A second percentage level is shown on the graph, which represents 125% of the expected claim level. With the two percentage levels, three layers are created. The responsibility for the payment of claims is distributed among three separate entities in this implementation. A first layer represents percentage levels 0-100, which is the self-funded layer. Thus, the respective client group is responsible for paying up to 100% of the expected claims. A second layer represents percentage levels above the second percentage level (e.g., 125% in this embodiment). This layer represents the stop loss layer, which is the range that is handled by the stop loss carrier (e.g., stop loss carrier 24). A third layer is an intermediate layer between the first and second layers and spans between the first percentage level and second percentage level. This intermediate layer represents the claims that are paid by the intermediate coverage carrier (e.g., intermediate coverage carrier 26).

The arrangement of FIG. 10 provides self-funded liability and liability transferred to both a mutually owned intermediate coverage entity and a stop loss carrier. In this arrangement, which is populated by three risk-bearing entities, the insurance system 20 organizes the distribution of claim liability in such a way that the client has direct liability only up to the first percentage level (e.g., 100% of expected claims). Beyond the "self-funded" layer, aggregate claim risk is absorbed by the intermediate coverage carrier through the operation of the Captive Pool having the LARA coverage format, which absorbs aggregate liability from the first percentage level to the second percentage level (e.g., 100% of expected claims to 125% of expected claims). Beyond the second percentage level, a stop loss insurance carrier is liable for these claims. The LARA stop loss policy embodies an actuarial and distributive accounting nexus of the MLLC 54 (e.g., the Captive Pool) which permits each company to effectively convert its own individual potentially catastrophic expense of claims totaling up to 25% more than expected, to a share in the collective experience of all Client Companies claims activity in the 100% to 125% layer of claim funding risk. This conversion presents, actuarially, the likelihood of some level of claims activity each year, but a likely level of activity that is lower, more predictable and more acceptable than the full risk of 25% of annualized claims.

Figure 11:
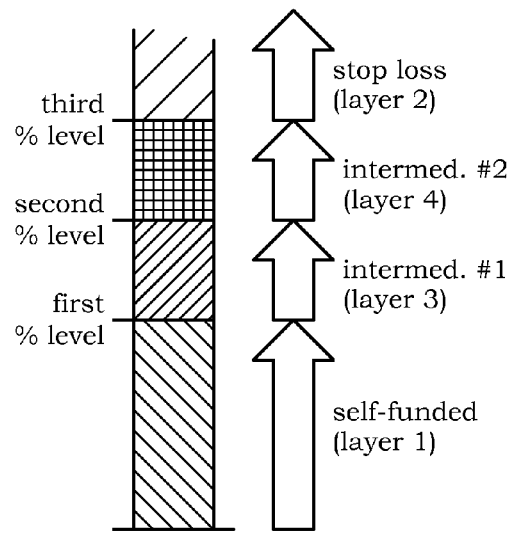
FIG. 11 is a second graph showing the financial risk distribution for an insurance plan, according to various implementations of the present disclosure.

FIG. 11 is a second graph showing another embodiment of a financial risk distribution for an insurance plan. This graph is similar to the graph of FIG. 10 except that there are multiple layers between the self-funded layer (i.e., layer 1) and the stop loss layer (i.e., layer 2). As shown, there is a third layer that extends from the first percentage level to a second percentage level and a fourth layer that extends from the second percentage level to a third percentage level. The third and fourth layers (and additional intermediate layers in other embodiments) are the liability of a first and second intermediate carrier (and additional carriers in other embodiments). The second layer or stop loss layer includes any claim over the third percentage level. In other embodiments, any number of intermediate carriers can make up the intermediate layers. Also, the percentage levels in FIGS. 10 and 11 may include any suitable levels. For example, the first percentage level may range from about 50% to about 120% of the expected claims. In some embodiments, the second percentage level shown in FIG. 11 may be about 100%, such that the first intermediate layer covers claims from a first percentage level (e.g., a level from about 30% to about 70%) up to the 100% level.

Figure 12:
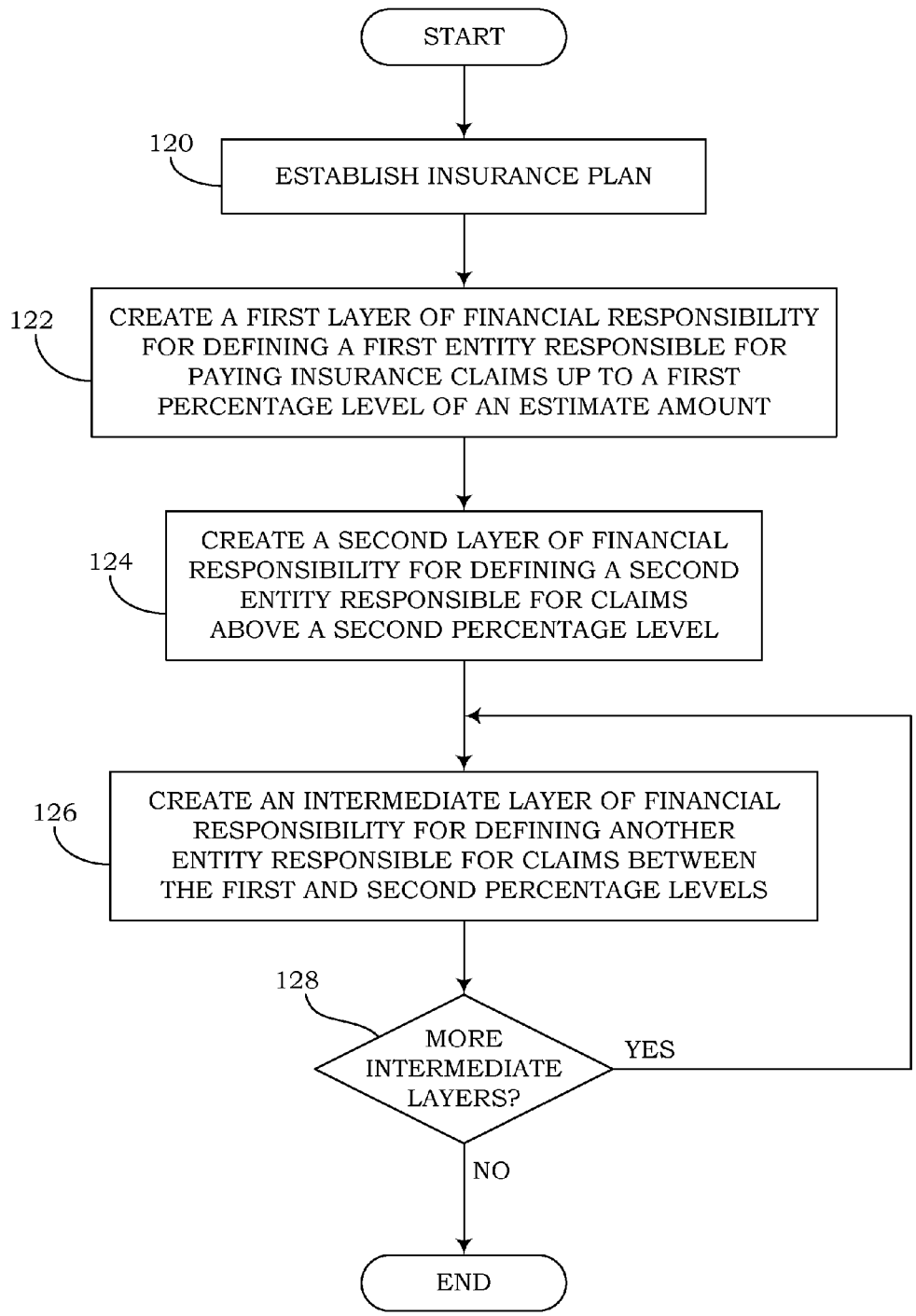
FIG. 12 is a flow diagram illustrating a method of creating an insurance plan, according to various implementations of the present disclosure.

FIG. 12 is a flow diagram illustrating an embodiment of a method for creating an insurance plan. The method begins with the establishment of an insurance plan, as indicated in block 120, which may include, among other things, enabling each entity to agree with established rules and regulation of the insurance plan.

As indicated in block 122, a first layer of financial responsibility is created for the insurance plan. The first layer correlates to a first entity that is responsible for paying insurance claims up to a first percentage level of an expected amount. For example, the first percentage level may be about 100% of the expected amount of expected actuarially determined claims. As indicated in block 124, a second layer of financial responsibility is created for the insurance plan. The second layer defines a second entity that is responsible for paying insurance claims above a second percentage level. For example, the second percentage level is greater than the first percentage level and in some embodiments may be about 125% of the expected amount.

As indicated in block 126, an intermediate layer of financial responsibility is created for defining another entity that is responsible for insurance claims between the first and second percentage levels. For example, the intermediate layer may be a range from 100-125% of the expected amount. According to decision block 128, it is determined whether more intermediate layers are to be included between the first and second percentage levels. If so, the method returns back to block 126 to create additional layers of financial responsibility for additional entities. However, if it determined that no more intermediate layers are to be added, the method comes to an end.

The present technology provides software implemented methods and a local or distributed computer or communication network system comprising at least one storage device, at least one memory device, at least one input interface, at least one user interface, and at least one software module running in the memory of such network system with computer implemented methods and input methods to provide healthcare insurance methods and systems for mid-range companies comprising a wellness risk pooling arrangement, which comprises a Wellness Pool, that is continuously maintained and monitored by the input and output functions of the computer methods and systems. A method may comprise use of a computer and software to estimate and determine a company's actuarial risks of healthcare costs based on in part, a health status assessment of its employees; determination of the costs of meeting those healthcare costs to establish the self-funded component of the healthcare costs; providing a predetermined percentage of the self-funded component as a monetary contribution to a financial pool managed and controlled by the healthcare insurance provider, wherein such pool of monetary assets is made up of the contributions of one or more mid-sized companies.

The status of the pool is continuously monitored and maintained by computer implemented methods, input methods, and software implemented methods using, for example, a local or distributed computer or communication network system comprising at least one storage device, at least one memory device, at least one input interface, at least one user interface, and at least one software module running in the memory of such network system. Healthcare expenses of each company are withdrawn from the pool to pay expenses that are in excess of the self-funded component. Healthcare expenses for an individual company that exceed the second percentage level are paid to the company by a stop-loss insurance policy.

An aspect of the technology comprises acquiring and inputting data related to the health status of the individuals of a company into a computer system in communication with the system used in assessing the actuarial risks of the company. Such information, which may be analyzed and calculated by computer implemented methods, may include the actions resulting from personal consultations with individuals or other actions taken by an individual in maintaining or improving his or her health status.

All claims paid on behalf of participants in the group are used in analyzing and calculating by computer implemented methods to obtain a healthcare risk assessment of the company in the year following the first year of entering the LARA pool. Insofar as the size (employee count) of the Member company is less than that required for 100% experience credibility (actuarial reference exclusively to the previous claim results of the group in setting prospective premium rates and factors) the collective data of Member companies in the Wellness Pool will be used based on statistical credibility standards as the "manual" or "pooled" component of the rate calculation.

FIGS. 13A-13C are flow diagrams illustrating embodiments of methods to be performed by the stop loss carrier 24 shown in FIG. 3. FIG. 13A illustrates processes involved in setting up insurance coverage policies, FIG. 13B illustrates processes of handling claims during a coverage period, and FIG. 13C illustrates analysis of a completed coverage period.

In FIG. 13A, as indicated in block 132, the stop loss carrier 24 receives records and information about members of the various client groups and information about previous coverage for the client groups. As indicated in block 134, a risk analysis is performed, based in part on the received information. According to block 136, the method includes determining premium rates for each client group. As indicated in block 138, the premium rates, definition of coverage, percentage levels, and other information is communicated to the client groups, administrator, and intermediate coverage carrier. These functions represent the establishment of an insurance plan.

Once the plan is in place, the stop loss carrier performs additional functions, as shown in FIG. 13B, based on claim activity. As indicated in block 140, the stop loss carrier receives all the insurance claims that exceed a first percentage level (e.g., 100%). Since the insurance claims up to the first percentage level are self-funded, the stop loss carrier does not necessarily need to receive the claims below the first percentage level. As indicated in block 142, the claims between the first percentage level and a second percentage level (e.g., 100-125%) are communicated to the intermediate coverage carriers. The stop loss carrier does not necessarily need to communicate the claims over the second percentage level (e.g., 125%) to the intermediate coverage carriers because those claims exceeding that level are the responsibility of the stop loss carrier itself. As indicated in block 144, the method includes receiving payments from the intermediate coverage carriers for the claims within the intermediate layer.

At the end of a coverage period 145, the stop loss carrier performs additional functions as shown in FIG. 13C. Risks are re-evaluated, claim activity is recorded, and each client group's share of the claims and costs are determined (step 146). As indicated in block 148, the stop loss carrier performs an actuarial analysis based on the member data. From this data, the method includes performing a renewal process as indicated in block 150. After renewal, the method loops back to block 132 shown in FIG. 13A and repeats the operations. In some embodiments, particularly when actuarial data is substantially the same as in a previous coverage period, the method may return back to block 140 shown in FIG. 13B. After renewal (block 150), other steps may be skipped for the second and subsequent coverage periods as would be understood by one of ordinary skill in the art.

Figure 14:
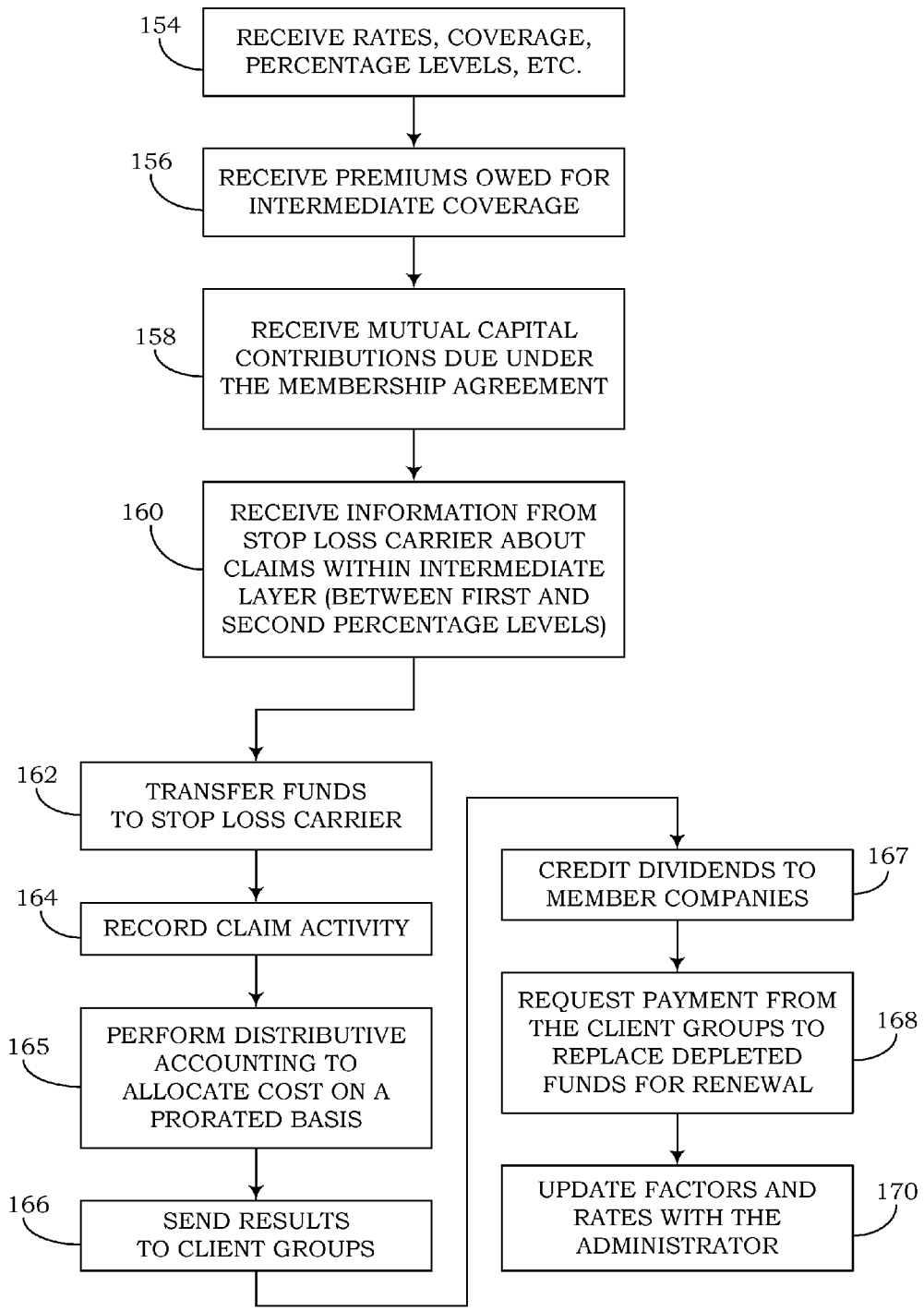
FIG. 14 is a flow diagram illustrating a method of the intermediate coverage carrier shown in FIG. 3, according to various implementations of the present disclosure.

FIG. 14 is a flow diagram illustrating an embodiment of a method performed, for example, by the intermediate coverage carrier 26 shown in FIG. 3. As indicated in block 154, the intermediate coverage carrier 26 receives the rates, coverage definitions, percentage levels, and other information from the stop loss carrier. In block 156, it is indicated that premiums that are owed for setting up an account for intermediate coverage is received. As indicated in block 158, the intermediate coverage carrier receives mutual capital contributions due under the membership agreement for member companies of the mutual captive.

As indicated in block 160, the method includes receiving information from the stop loss carrier about insurance claims within an intermediate layer (e.g., between first and second percentage levels). As indicated in block 162, an appropriate amount of funds are transferred to the stop loss carrier to cover the claims within the intermediate layer. In block 164, it is indicated that claim activity is recorded. In block 165, distribution accounting is performed to allocate costs on a prorated basis. At the end of the coverage period, results are sent to the client groups, as indicated in block 166. As indicated in block 167, dividends are credited to the accounts of the member companies as appropriate. According to block 168, renewal rate adjustments are made to replace depleted funds from the respective accounts. As indicated in block 170, factors and rates are updated with the administrators.

Figure 15:
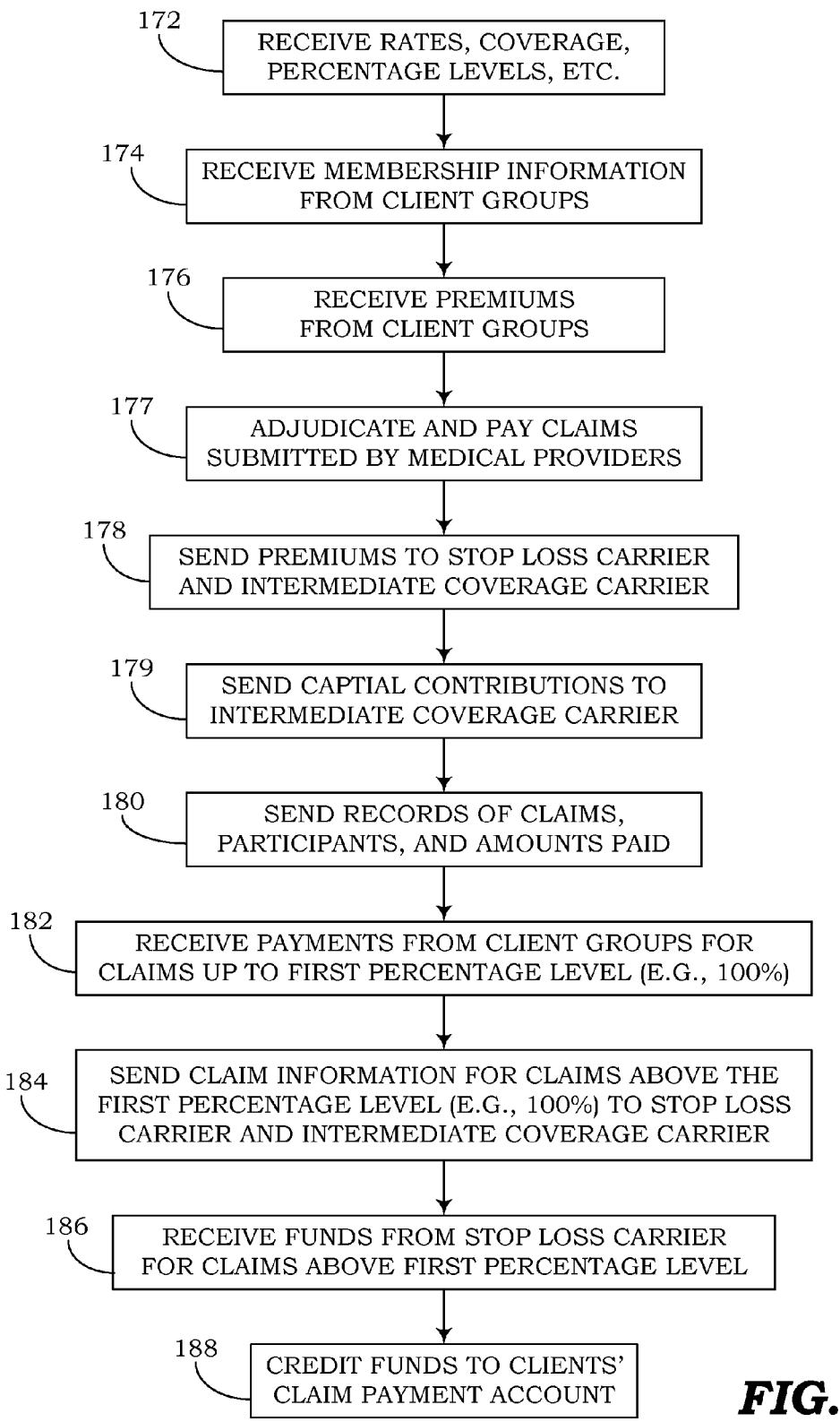
FIG. 15 is a flow diagram illustrating a method of the administrator shown in FIG. 3, according to various implementations of the present disclosure.

FIG. 15 is a flow diagram illustrating an embodiment of a method to be performed by the second administrator 29 shown in FIG. 3. In other embodiments, the method of FIG. 15 may be performed by an administrator made of a combination of the first and second administrators 28, 29. As indicated in block 172, the administrator receives the rates, coverage definitions, percentage levels, and other information from the stop loss carrier. In block 174, it is indicated that the administrator receives membership information from the client groups. Also, premiums from the client groups are received, as indicated in block 176. In block 177, the method includes adjudicating and paying claims submitted by medical providers. These premiums are distributed to the stop loss carrier and intermediate coverage carriers as appropriate (step 178). According to block 179, capital contributions are sent to the intermediate coverage carrier. The administrator also sends records of claims, participants, and amounts paid to the stop loss carrier and intermediate coverage carriers (step 180).

Once the insurance plan is established and premiums are properly paid, the administrator may receive payments from the client groups for insurance claims up to a first percentage level (e.g., 100%), as indicated in block 182. As indicated in block 184, claim information is sent for claims above the first percentage level (e.g., 100%) to the stop loss carrier. This claim information may also be sent to the intermediate coverage carrier for their records. According to block 186, the administrator receives funds from the stop loss carrier for claims exceeding the first percentage level. As indicated in block 188, the method includes crediting funds to the client groups' claim payment accounts as necessary.

The flow diagrams of FIGS. 12-15 show the architecture, functionality, and operation of various implementations of the MLLC 54 shown in FIG. 4. As mentioned above, the MLLC 54 may have different functionality for each of the respective components of the insurance system 20, the difference which may be seen in the various steps of FIG. 13-15 performed by the different components. It should be understood that the routines, steps, processes, or operations described herein may represent any module or code sequence that can be implemented in software or firmware. In this regard, each block may represent a module, segment, portion of code, etc., which comprises one or more executable instructions for performing the specified logical functions. It should further be noted that the functions described with respect to the blocks may occur in a different order than shown. For example, two or more blocks may be executed substantially concurrently, in a reverse order, or in any other sequence depending on the particular functionality involved.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

I claim:

1. A computer-implemented method comprising establishing, automatically by a computer, a health insurance plan for one or more client groups, wherein the health insurance plan comprises at least three layers of financial responsibility, wherein each client group comprises one or more plan members, and wherein the establishing further comprises:
    creating a first layer of financial responsibility within a total claim liability continuum of the health insurance plan, the first layer comprising a self-funded layer defining the financial responsibility of a respective client group for health insurance claims up to a first percentage level of an expected amount of a cumulative claim value in a plan period, the cumulative claim value being an estimated total value of all individual plan members claim totals expected within the plan period based on actuarial data for the respective client group, wherein each of the individual plan members claim totals is limited to a specific stop loss threshold;
    creating a second layer of financial responsibility within the total claim liability continuum, the second layer comprising a stop loss layer defining the financial responsibility of a stop loss insurance company for health insurance claims above a second percentage level of the expected amount, the second percentage level being higher than the first percentage level; and
    creating at least one intermediate layer of financial responsibility within the total claim liability continuum, the at least one intermediate layer comprising a mutually-funded layer defining the financial responsibility of an intermediate coverage insurance company for health insurance claims between the first and second percentage level.

2. The computer-implemented method of claim 1, wherein the intermediate coverage insurance company comprises a mutual captive insurance company.

3. The computer-implemented method of claim 2, wherein establishing the health insurance plan further includes an agreement that at least a minimum percentage of the members of each client group participate in one or more wellness programs.

4. The computer-implemented method of claim 3, wherein the agreement is established as a condition for participation in the mutual captive insurance company.

5. The computer-implemented method of claim 1, wherein the first percentage level is between 50% and 120% of the expected amount according to the actuarial data.

6. The computer-implemented method of claim 5, wherein the first percentage level is 100% of the expected amount according to the actuarial data.

7. The computer-implemented method of claim 1, wherein the second percentage level is more than 100% of the expected amount according to the actuarial data.

8. The computer-implemented method of claim 7, wherein the second percentage level is 125% of the expected amount according to the actuarial data.

9. The computer-implemented method of claim 1, wherein actuarial data extracted from members of the one or more client groups is more heavily weighted for purposes of premium rate setting than actuarial data extracted from the individuals and groups not participating in the health insurance plan.

10. The computer-implemented method of claim 1, further comprising enabling a transfer of funds among a group of entities comprising the client group, the stop loss insurance company, and the intermediate coverage insurance company according to the financial responsibilities of each of the group of entities.

11. The computer-implemented method of claim 1, further comprising determining health insurance premiums and claim factors for each client group.

12. A non-transitory computer program product storing thereon a computer program that, when executed by a computer processor, causes the computer processor to establish a health insurance plan for one or more client groups, wherein the health insurance plan comprises at least three layers of financial responsibility, wherein each client group comprises one or more plan members, and wherein the establishing further comprises:

creating a first layer of financial responsibility within a total claim liability continuum of the health insurance plan, the first layer comprising a self-funded layer defining the financial responsibility of a respective client group for health insurance claims up to a first percentage level of an expected amount of a cumulative claim value in a plan period, the cumulative claim value being an estimated total value of all individual plan members claim totals expected within the plan period based on actuarial data for the respective client group, wherein each of the individual plan members claim totals is limited to a specific stop loss threshold;

creating a second layer of financial responsibility within the total claim liability continuum, the second layer comprising a stop loss layer defining the financial responsibility of a stop loss insurance company for health insurance claims above a second percentage level of the expected amount, the second percentage level being higher than the first percentage level; and creating at least one intermediate layer of financial responsibility within the total claim liability continuum, the at least one intermediate layer comprising a mutually-funded layer defining the financial responsibility of an intermediate coverage insurance company for health insurance claims between the first and second percentage levels.

13. The computer program of claim 12, wherein the intermediate coverage insurance company is a mutual captive insurance company owned by the one or more client groups.

14. The computer program of claim 12, wherein the intermediate coverage insurance company is a not-for-profit company.

* * * * *